Figure 1:
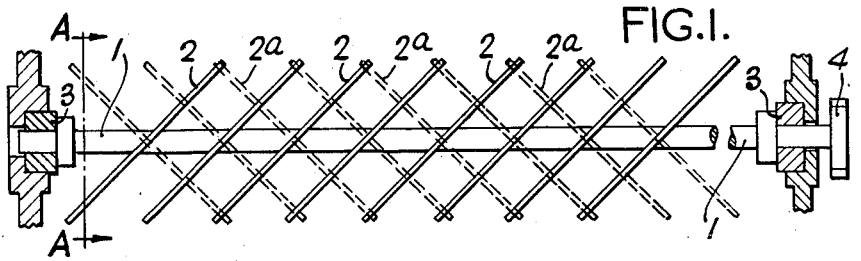

June 15, 1965     D. S. BLISS     3,189,113
GROUND EFFECT VEHICLE WITH FLUID FLOW DIRECTION VARYING MEANS
Filed June 7, 1962     2 Sheets-Sheet 1

INVENTOR
DENYS S. BLISS
BY Cameron, Kerkam + Sutton
ATTORNEYS

June 15, 1965  D. S. BLISS  3,189,113
GROUND EFFECT VEHICLE WITH FLUID FLOW DIRECTION VARYING MEANS
Filed June 7, 1962  2 Sheets-Sheet 2

INVENTOR
DENYS S. BLISS
BY
Cameron, Kerkam + Sutton
ATTORNEYS

United States Patent Office 3,189,113
Patented June 15, 1965

3,189,113
GROUND EFFECT VEHICLE WITH FLUID FLOW DIRECTION VARYING MEANS
Denys Stanley Bliss, Ashurst, Southampton, England, assignor to Hovercraft Development Limited, London, England, a British company
Filed June 7, 1962, Ser. No. 200,830
Claims priority, application Great Britain, June 9, 1961, 20,938/61
6 Claims. (Cl. 180—7)

This invention relates to apparatus for varying the direction of flow of a fluid.

According to the invention there is provided apparatus for varying the direction of flow of a fluid comprising at least one vane rotatably supported in the path of the fluid flow the axis of rotation being transverse to the said path, the vane being at an oblique angle to the said rotational axis, so as to present a defleting surface to the fluid flow, the angle of which may be varied by said rotation.

The invention can be used for varying the direction of flow of a fluid through a duct or from a duct and also for directing a flow in a duct from one outlet to another. A further use of the invention is in vehicles of the type which are supported above the surface over wnich they are to operate by one or more gaseous cushions formed and contained by fluid curtains issuing from ports formed in the bottom of the vehicle.

In such vehicles it has been proposed to provide vanes for varying the angle of ejection of the curtain forming fluid, relative to the vertical, to provide propulsive and other thrusts. The vanes are hingedly attached to the walls of the ducts or ports through which flows the fluid and the thrust reaction is thus taken by these walls. For economy in weight, the ducts and nozzles require to be made of as thin material as possible, and some local strengtnening is thus necessary to take the thrust reaction loads. In addition, bearings for each vane and also some means of operating each vane is required the whole resulting in a rather heavy construction.

The present invention provides a convenient way of avoiding the necessity for local strengthening and individual operating means for each vane, as the thrust reaction loads are carried by the vane supporting structure, which can be mounted from suitable points on the main structure of the vehicle which are capable of readily taking the reaction loads. The vanes are operated by rotating the supporting structure and only one operating means need be provided for each structure. According to a feature of the invention therefore there is provided a vehicle for travelling over a surface which is at least partly supported above that surface by a cushion of pressurised gas formed beneath the vehicle and at least partly contained beneath the vehicle by a curtain of fluid issuing from a port or series of ports formed in the bottom of the vehicle, having means for varying the angle of ejection of the fluid through the port or ports in a fore and aft direction comprising a series of vanes supported in a duct leading to the said port or ports and rotatable about an axis transverse to the fluid flow there-through, the vanes being at an angle to the said axis and means for rotating the vanes whereby the inclination of the vanes relative to the vehicle is varied.

In a vehicle as described above, the curtain forming fluid is normally ejected in a vertical direction or in an inwards direction towards the centre of the vehicle. The application of a forwards or rearwards component of direction on the fluid by the vanes, results in a slightly weaker curtain. It is therefore desirable to increase the mass flow of the curtain forming fluid at those positions where such components of direction are caused. According to another feature of the invention, in a vehicle as described above, there is provided means for varying the mass flow of the fluid through the port or ports, the mass flow being increased as the vanes are moved from a position in which no component of direction forwards or rearwards is applied to a position in which such a component is applied.

The invention is applicable whether the fluid flow is liquid, gaseous or a mixture of liquid and gas. For convenience, however, hereinafter the fluid will be considered as air.

Figure 2:
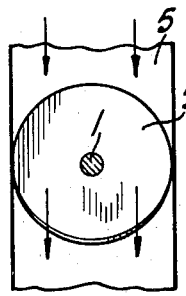
Figure 3:
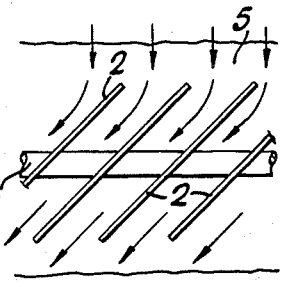
Figure 4:
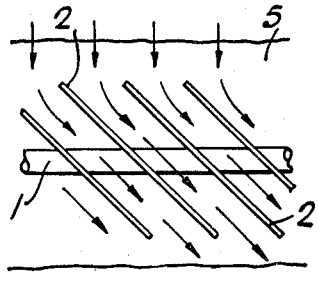
Figure 5:
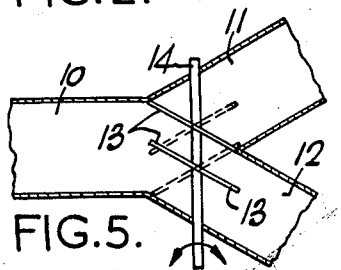
Figure 6:
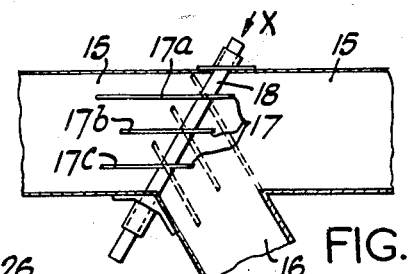
Figure 7:
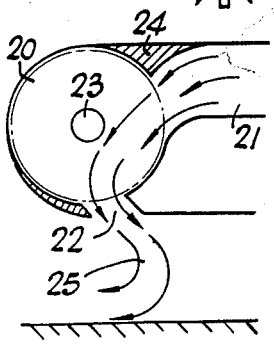
Figure 8:
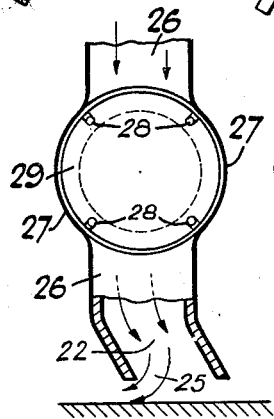
Figure 9:
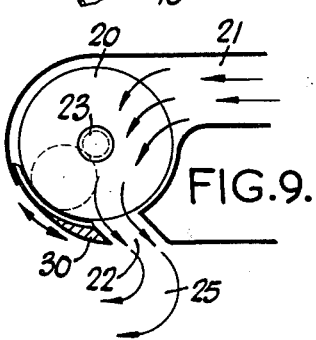
Figure 10:
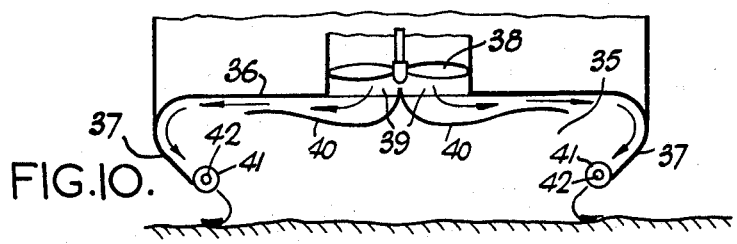
Figure 11:
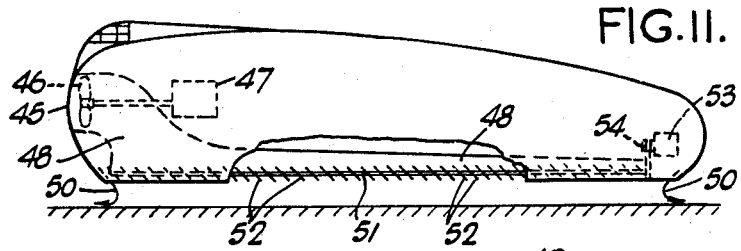
Figure 12:
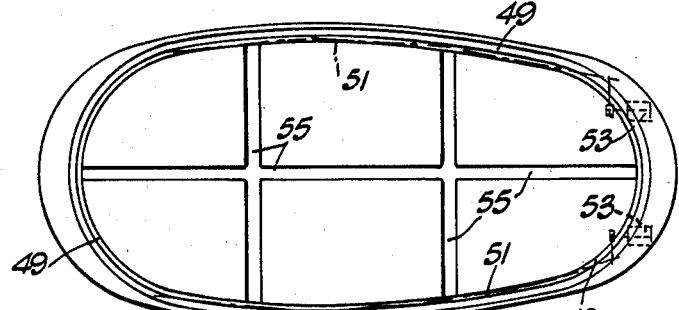
Figure 13:
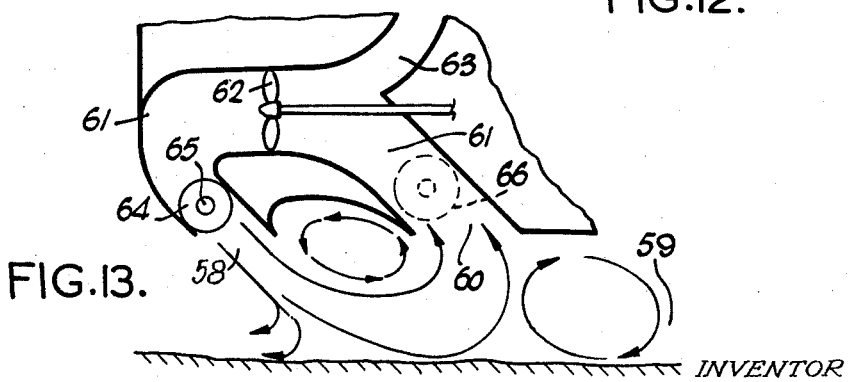

The invention will readily be understood by the following description of certain embodiments in conjunction with the accompanying drawings in which:

FIGURE 1 is as ide elevation of one embodiment,

FIGURE 2 is an end elevation of the arrangement shown in FIGURE 1, as seen when positioned in a duct, on the line A—A of FIGURE 1, FIGURE 3 is a diagrammatic side elevation of the arrangement shown in FIGURE 2 illustrating the air flow with the vanes in one position, FIGURE 4 is a similar view to that of FIGURE 3 illustrating the air flow when the shaft is rotated to alter the inclination of the vanes, FIGURE 5 is a cross-sectional view illustrating a further embodiment, FIGURE 6 is a cross-section of yet a further embodiment, FIGURE 7 is a cross-section normal to the rotational axis of the vane illustrating another embodiment, FIGURE 8 is an end elevation, similar to that of FIGURE 2, illustrating an alternative form of construction, FIGURE 9 is a cross-section similar to that of FIGURE 7, illustrating means for varying the mass-flow of air, FIGURE 10 is a vertical cross-section through a vehicle provided with a further embodiment, FIGURE 11 is a side view of a vehicle embodying the invention, part of the lower portion of the vehicle being shown with the outer skin removed, FIGURE 12 is an inverted plan view of the vehicle illustrated in FIGURE 11, and FIGURE 13 is a vertical cross-section through the periphery of a vehicle embodying the invention, illustrating an alternative curtain forming arrangement.

The essence of the invention, as illustrated in FIGURE 1, is a rotatable shaft 1 on which are mounted a number of vanes 2. The shaft may be supported at each end by bearings 3, as shown, and can be rotated by means of a gear wheel 4. The vanes 2 are mounted non-movable on the shaft 1 and at an oblique angle to the rotational axis of the shaft. Rotation of the shaft through 180° will alter the inclination of the vanes 2 to the position shown dotted at 2(a).

Conveniently the vanes are of an eliptical form such that they appear circular when viewed along the rotational axis of the shaft as in FIGURE 2. The vanes can then be arranged to be in contact with both walls of the duct 5 at all times, preventing the flow of air past the sides of the vanes. Other shapes, can however, be used, subject to there being sufficient distance between the duct walls for the vanes to be rotated. As seen in FIGURES 3 and 4, the air flow through the duct 5 can be caused to issue with a component of direction in the line of the shaft 1, the component being in one direction or the other depending upon the position of the vanes. By rotating the shaft 2 to a mid-position, the vanes are normal to the shaft axis in the plane of flow of the fluid and there will be no deflection of the flow. At intermediate positions between the mid-position and 90° either side of this position, there will be also a component of direction of flow normal to the shaft axis.

FIGURES 1 to 4 illustrate the use of the invention to vary the direction of flow through a duct. The invention can also be used to control and vary the flow of air, or other fluid from one duct into another at the junction thereof. One such arrangement is illustrated in FIGURE 5. The flow through a duct 10 can be directed into two further ducts 11 and 12. Vanes 13 mounted on a shaft 14 are positioned at the junction of the ducts 10, 11 and 12. By rotating the shaft 14 and thus the vanes 13, the air flowing through the duct 10 can be directed either into duct 11 or duct 12, or even into each of the ducts 11 and 12, depending upon the rotary position of the vanes. The vanes can be arranged so that one of them acts to shut off access to duct 11 when the shaft 14 is in one extreme rotary position and another vane acts to shut off access to the duct 12 when the shaft 14 is in the other extreme rotary position. These two extremes are shown in FIGURE 5 by the full lines and dotted lines respectively.

FIGURE 6 illustrates an arrangement in which the axis of rotation of the vanes is not only transverse to the flow through the duct but is also inclined. The main flow is straight through the duct 15, whilst a further duct 16 branches to one side. Vanes 17 are mounted on a shaft 18 and in one extreme rotary position lie in planes parallel to the flow in the duct 16. By rotating the shaft 18 and also vanes 17 the air flowing through the duct 15 is deflected into the branch duct 16. In FIGURE 6, the shaft and vanes rotate, from the position shown, in a clockwise direction when received along the rotational axis in the direction of the arrow X. To enable the vanes to rotate it is necessary for the top vane 17a to be asymetrically mounted on the shaft. To avoid the lower vanes 17B and 17C each masking the next higher vane when rotated to the position indicated by the dotted lines it is necessary for these vanes to be asymetrically mounted on the shaft also.

In the examples illustrated in FIGURES 2 to 6, the shaft is directly in the flow path of the fluid. This can lead to turbulence and energy loss. FIGURES 7, 8 and 9 illustrate arrangements of the invention in which the shaft can be positioned at least to some extent out of the main flow, by forming an enlargement in the duct.

In FIGURE 7 the vanes 20 are positioned at a bend in the duct 21 and the duct is enlarged on the outside of the bend. The air flows through the duct 21 and issues from an outlet 22. By positioning the shaft 23 and vanes 20 at least partly in the enlargement of the duct 21, the air flow can be caused to flow over only a part of each vane and avoid the shaft. To even further improve the flow and reduce interference between the shaft 23 and the air flow a deflector 24 can be placed in the duct 21. When the invention is being applied to a vehicle which is supported over a surface by one or more cushions of pressurised gas curtained by one or more curtains of fluid, then, in the arrangement illustrated in FIGURE 7, the outlet 22 can form the supply port from which issues the fluid forming the curtain as shown at 25.

FIGURE 8 illustrates an arrangement for a straight duct 26 in which an enlargement 27 is formed on both sides and instead of a single shaft four shafts 28 are provided which extend through openings in, and are fixed to, the vanes 29 at equally spaced points around the peripheries thereof, as shown. The vanes 29 rotate in the enlarged portion of the duct 26 and the shafts 28 can be so positioned that at mid-position of the vanes, when no deflection is caused and at 90° either side of this position, when there is maximum deflection in one direction or the other parallel to the rotational axis of the vanes, the shafts 28 are out of the main flow path of the air. The shafts 28 are mounted in supports at their ends so that they and the vanes 29 can be rotated as a unit about a central axis by rotating the supports in any suitable manner, as by means of a worm and worm wheel drive.

When the shaft or shafts, with the vanes, are rotated, the vanes impose a component of direction, on the air, parallel to the axis of the shaft or rods. When the invention is applied to a vehicle which is supported by a cushion of pressurised air contained by curtains of air, such a component of direction provides a thrust which will propel the vehicle, forwards and backwards, or can provide a turning moment. The effect of imposing such a component of direction, however, weakens the air curtain and the desired cushion pressure can only be maintained at a reduced height. It is therefore desirable to be able to increase the strength of the air curtain and one way of readily doing this is to increase the mass flow of curtain forming air by widening the supply port through which issues the air forming the curtain.

FIGURE 9 illustrates diagrammatically one way of widening the outlet or supply port 22 of FIGURE 7. The outer edge of the supply port is made as a separate arcuate section 30 which can slide inside the casing of the duct 21. Preferably the separate section 30 is arranged to be moved in unison with the shaft 23 in any suitable manner, and by gearing the ends of the shaft to racks formed on the ends of the section 30, rotation of the shaft in either direction from the mid-position thus widening the supply port 22.

As an alternative to increasing the mass flow by widening the supply port, spoilers may be provided to act when no deflection is carried out.

Whilst, in the examples so far described, the vanes have been considered as being in a flow path bound on opposing sides by the walls of a duct, it is possible also to position vanes in a flow path which is unbounded or bounded on one side only. FIGURE 10 illustrates the application of the invention to a vehicle which is supported by a cushion of pressurised air the cushion being contained at the lower part of its periphery by a curtain of air.

In the vehicle illustrated in FIGURE 10 the cushion is formed in a space 35 bounded at the top by the bottom 36 of the vehicle, and round the periphery by a downwarly extending member 37. Air is energised by a propeller 38 and enters the space 35 by means of a port 39, formed in the bottom 36 of the vehicle. Positioned below the port 39 is a deflector 40 which deflects the air outwards towards the periphery of the space 35. When the air reaches the periphery it is deflected downwards to flow down the inside of the member 37. The air issues from the bottom of the member to form an air curtain between the bottom of the member 37 and the surface over which the vehicle is supported.

A number of vanes 41 mounted on the shafts 42 are positioned at the bottom of the member 37, the shafts 42 being substantially parallel to the member. The form of the vanes and their operation is as described above with respect to FIGURES 1 to 4 and the effect is the same. The air as it issues from the bottom of the member 37 can be deflected to give a thrust along the axis of each shaft. The vanes can be provided only in a general fore and aft direction to give propulsive and turning thrusts or they can also be provided in a direction across the vehicle to give sideways thrusts in addition.

A vehicle embodying deflecting apparatus as illustrated in FIGURES 1 to 4 and described above is illustrated diagrammatically in FIGURES 11 and 12. Air is drawn in through an intake 45 by a propeller 46 driven by an an engine 47. The air flows into a duct 48 which is positioned round the periphery of the bottom of the vehicle. The air issues from an annular supply port 49 formed in the bottom of the duct 48 and forms an air curtain 50. Positioned along each side of the vehicle, in the path of the air flow from the duct 48 to the supply port, is a shaft 51 with vanes 52, substantially as described above and illustrated in FIGURES 1 to 4. A rotary actuator 53 is connected by gearing 54 to one end of each shaft, the actuator rotating the shaft one way or the other in response to the requirements of the pilot of the vehicle.

Vanes with their supporting shafts or rods, are normally only provided for straight portions of the sides of the vehicle, but they can be positioned at curved portions by making the assemblies in short lengths and connecting them by flexing couplings. Vanes can also be provided across the front and rear of a vehicle for providing a sideways thrust or a turning moment. Where the cushion of pressurized air is subdivided by further curtains of air flowing from further supply ports, as for example from supply ports 55 in FIGURE 12, vanes with their supporting structure may be positioned in the flow of air to the further supply ports in substantially the same manner as that illustrated in FIGURES 1 to 4. In this latter example it is normally not necessary to provide increased mass flow when the vanes are operative.

Although, in the above description of vehicles embodying the invention, the curtain has been considered as being of a simple type, with all the curtain forming air escaping to the atmosphere, the invention can readily be applied to vehicles of the type in which more complicated curtain forms are used. Such curtain formations, are for example, those where at least part of the curtain forming air is recovered and reused. Such an arrangement is illustrated in FIGURE 13. Air issues from a supply port 58 flowing downwards and inwards. The air is deflected round and upwards by the pressure of the air cushion formed in the space 59 and flows into a recovery port 60 formed inboard of and substantially parallel to the supply port. From the recovery port the air flows via a duct 61 back to the supply port 58 being re-energised by a compressor 62. Additional air is supplied via duct 63 as required to make up for losses from the curtain system. Vanes 64 mounted on a shaft 65 are positioned in the duct 61 adjacent to the supply port 58, the form and operation being as described above and illustrated in FIGURES 1 to 4. Vanes can be positioned in the recovery port 60 as indicated by the dotted lines 66. The fluid forming the curtain can only be deflected once in such a recorvery system. If any attempt is made to redeflect the air to straighten it, then this will result in a thrust in a reverse sense.

The invention may also be used where multiple air curtains are formed, being applied to any or all of the air curtains.

Where curtains having deflecting means as described above abut at their ends to other curtains, or to structural members, it is desirable to arrange that the angle at which the vanes are mounted varies successively for the end few vanes so as to provide a transition region. This avoids forming a gap at one end or the other of the curtain when it is deflected.

I claim:

1. A vehicle of the type which in operation is supported over a surface by at least one cushion of pressurised gas containing beneath the vehicle at least in part by a curtain of moving fluid issuing from a supply port in the lower part of the vehicle, including a duct for supplying fluid to said supply port, said duct having a portion of enlarged cross-section upstream of said supply port, at least one shaft rotatably mounted in said duct with its axis substantially parallel to said supply port and perpendicular to the direction of fluid flow through said duct, said shaft being positioned within the enlarged portion of said duct out of the main path of flow of fluid through said duct, a plurality of vanes mounted on said shaft and inclined to the rotational axis thereof so as to present deflecting surfaces to the fluid flowing through said duct, and means for rotating said shaft to vary the deflection of the flow of fluid by said vanes.

2. A vehicle as claimed in claim 1 wherein the enlarged portion of said duct is formed on the outer side of a bend in said duct immediately upstream of said supply port.

3. A vehicle as claimed in claim 2 including deflecting means positioned in said duct upstream of and immediately adjacent to said enlarged portion and so formed as to deflect the flow of fluid towards said supply port and away from said shaft.

4. A vehicle as claimed in claim 1 including means for varying the width of said supply port.

5. A vehicle as claimed in claim 1 including a movable member forming the outer edge of said supply port, said member being operatively connected to said shaft so that rotation of the shaft actuates said member to vary the width of said supply port.

6. A vehicle of the type which in operation is supported over a surface by at least one cushion of pressurised gas contained beneath the vehicle at least in part by a curtain of moving fluid issuing from a supply port in the lower part of the vehicle, including a duct for supplying fluid to said supply port, said duct having a portion of enlarged cross-section upstream of said supply port and extending on both sides of said duct, a plurality of shafts mounted in the enlarged portion of said duct with their axes substantially parallel to said supply port and perpendicular to the direction of fluid flow through said duct, said shafts orbiting about a common axis and being positioned on opposite sides of the main path of flow of flud through said duct, a plurality of vanes mounted on said shafts and inclined to the rotational axis thereof so as to present deflecting surfaces to the fluid flowing through said duct, and means for effecting orbital movement of said shafts about said axis to vary the deflecting of the flow of fluid by said vanes.

References Cited by the Examiner

UNITED STATES PATENTS

| 2,834,560 | 5/58 | Werner et al. | |
| 2,853,835 | 9/58 | Crowle et al. | 98—40 |
| 2,864,301 | 12/58 | Katz | 98—40 |
| 3,039,550 | 6/62 | Beardsley | 180—7 |
| 3,130,939 | 4/64 | Alper et al. | 180—7 X |

FOREIGN PATENTS 219,133   11/58   Australia.

OTHER REFERENCES

Publication: "Symposium on Ground Effect Phenomena," Oct. 21–23, 1959; FIG. 5 on page 158 and FIG. 1 on page 224 relied on.

A. HARRY LEVY, *Primary Examiner.*